(12) United States Patent
Cao et al.

(10) Patent No.: US 12,129,895 B2
(45) Date of Patent: Oct. 29, 2024

(54) BISTABLE ELECTROMAGNETIC CLUTCH

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 52 days.

(21) Appl. No.: 17/860,929

(22) Filed: Jul. 8, 2022

(65) Prior Publication Data

US 2023/0145255 A1 May 11, 2023

(30) Foreign Application Priority Data

Nov. 11, 2021 (CN) .......................... 202111334916.7

(51) Int. Cl.
*F16D 27/14* (2006.01)
*F16D 27/00* (2006.01)
(Continued)

(52) U.S. Cl.
CPC .......... *F16D 27/14* (2013.01); *F16D 27/004* (2013.01); *F16D 27/108* (2013.01);
(Continued)

(58) Field of Classification Search
CPC ............. F16D 27/004; F16D 2027/005; F16D 2027/008; F16D 27/01; F16D 27/04;
(Continued)

(56) References Cited

U.S. PATENT DOCUMENTS 2,886,149 A * 5/1959 Baermann ............... F16D 27/06
188/161
5,739,605 A * 4/1998 Lazorchak ............ F16D 27/004
310/78
(Continued)

FOREIGN PATENT DOCUMENTS

CN        102109056 A       6/2011
CN        102398871 A       4/2012
(Continued)

OTHER PUBLICATIONS

Extended European Search Report in EP22188109.7, mailed Mar. 14, 2023, 4 pages.
(Continued)

*Primary Examiner* — Richard M Lorence
(74) *Attorney, Agent, or Firm* — ARENTFOX SCHIFF LLP

(57) ABSTRACT

A bistable electromagnetic clutch is provided that includes a first part, a second part and an spring part. The first part includes a yoke with a plurality of iron cores, and an electromagnetic coil on each of the iron cores. The second part includes a moving carrier disc and a magnetic conductive disc that is fixed on a side of the moving carrier disc that is away from the yoke. Several magnets are fixed on the moving carrier disc, and the iron cores and the magnets are provided in a correspondence relation. The spring part is configured to keep the moving carrier disc and the yoke in normally separated positions. Two adjacent electromagnetic coils form a group, two electromagnetic coils in a same group are wound to form a group of windings with identical magnetic polarities, and corresponding two magnets form a group of magnetomotive forces with identical magnetic polarities.

16 Claims, 1 Drawing Sheet

(51) Int. Cl.
*F16D 27/108* (2006.01)
*F16D 27/112* (2006.01)

(52) U.S. Cl.
CPC ...... *F16D 27/112* (2013.01); *F16D 2027/005* (2013.01); *F16D 2027/008* (2013.01)

(58) Field of Classification Search
CPC ........ F16D 27/06; F16D 27/10; F16D 27/108; F16D 27/112; F16D 27/14
See application file for complete search history.

(56) References Cited

U.S. PATENT DOCUMENTS

| | | | |
|---|---|---|---|
| 11,686,380 B2 * | 6/2023 | Cao | B60K 17/348 475/160 |
| 2022/0349460 A1 | 11/2022 | Yu et al. | |
| 2023/0358282 A1 | 11/2023 | Ping et al. | |

FOREIGN PATENT DOCUMENTS

| | | |
|---|---|---|
| CN | 202451651 U | 9/2012 |
| CN | 202674106 U | 1/2013 |
| CN | 103697099 A | 4/2014 |
| CN | 106838068 A | 6/2017 |
| CN | 108087448 A | 5/2018 |
| CN | 110375020 A | 10/2019 |
| CN | 209781518 U | 12/2019 |
| CN | 112145576 A | 12/2020 |
| CN | 113090732 A | 7/2021 |
| CN | 213899666 U | 8/2021 |
| DE | 102013202130 A1 | 8/2014 |
| EP | 4180682 A1 | 5/2023 |
| JP | 2008144870 A | 6/2008 |

OTHER PUBLICATIONS

Chinese Office Action mailed Feb. 1, 2024 in Chinese Patent Application No. 202111334916.7 (5 pages).
Japanese Office Action mailed Dec. 15, 2023 in Japanese Patent Application No. 2022-180421 (7 pages).

* cited by examiner

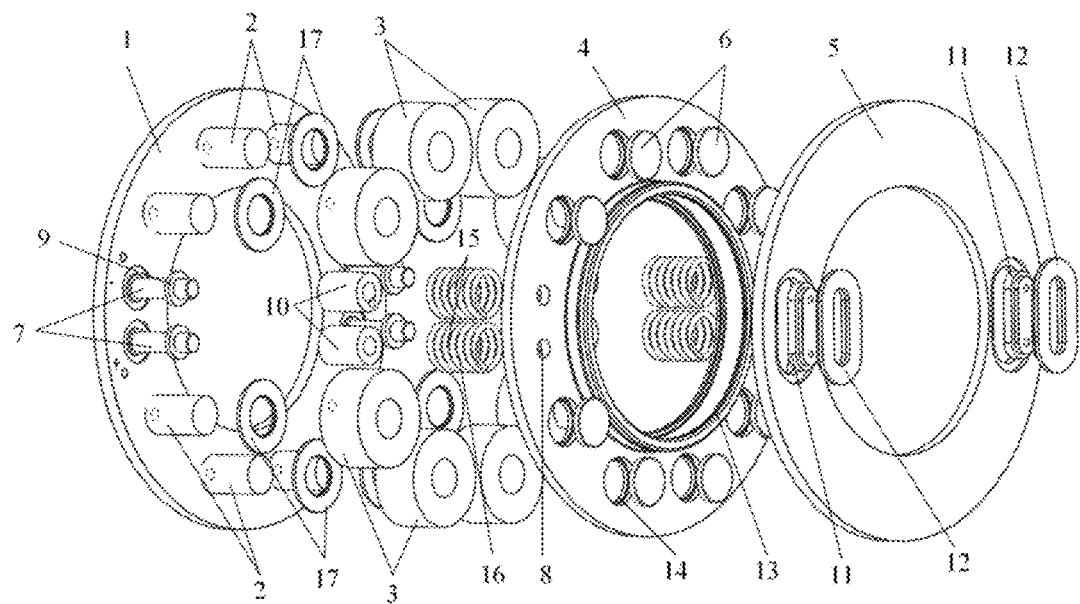

BISTABLE ELECTROMAGNETIC CLUTCH

TECHNICAL FIELD

The present disclosure belongs to the technical field of electromagnetic clutch, in particular relates to a bistable electromagnetic clutch.

BACKGROUND

With the continuous development of automobile industry, electromagnetic clutches have been widely used in new energy vehicles, and the requirements on the performance of electromagnetic clutches have become higher. However, at present, the conventional electromagnetic clutches have many shortcomings and problems, such as unintended open due to power loss or power failure, high energy consumption and heat generation as well as the electromagnetic force being liable to be affected by current fluctuation, which leads to high heat generation and high energy consumption of the electromagnetic clutch, and affects the performance and service life of the electromagnetic clutch to a certain extent.

SUMMARY

In view of the above problems, the present disclosure proposes a bistable electromagnetic clutch to solve the above problems or at least partially solve the above problems.

In order to achieve the above object, the present disclosure adopts the following technical solutions:

The present disclosure provides a bistable electromagnetic clutch, comprising a first part, a second part and a spring part;

the first part comprises a yoke, the yoke is provided thereon with a plurality of iron cores, and an electromagnetic coil is provided on each of the iron cores, the second part comprises a moving carrier disc and a magnetic conductive disc, the magnetic conductive disc is fixed on a side of the moving carrier disc that is away from the yoke, several magnets are fixed on the moving carrier disc, and the iron cores and the magnets are provided in a correspondence position/location;

the spring part is configured to keep the moving carrier disc and the yoke in normally separated positions;

two adjacent electromagnetic coils form a group, two electromagnetic coils in a same group are wound to form a group of windings with identical magnetic polarities, and corresponding two magnets form a group of magnetomotive forces with identical magnetic polarities.

Further, the yoke is provided with a guide pin, the moving carrier disc is provided with a guide hole, and the guide pin and the guide hole form an axial relative movable guide, and limit the other degree of freedom (DOF).

Further, a position-limiting flange is provided on an outer circumference of the guide pin, and the position-limiting flange cooperates with the guide hole to maintain an air gap between the iron core magnet when the clutch is engaged.

Further, the guide pin is made of a ferromagnetic material.

Two adjacent guide pins and two induction coils that are wound respectively on the two adjacent guide pins form a group, the two induction coils in a same group are wound to form a group of windings with identical magnetic polarities, and the two guide pins in a same group pass through the guide holes and form an axial air gap with an induction block which composed of a ferromagnetic material on the magnetic conductive disc: the axial position of the moving carrier disc relative to the yoke is judged according to a current signal output by the induction coil.

Further, a magnetic isolation sleeve is provided between the magnetic conductive disc and the induction block.

Further, the spring part is consisted by springs, the springs are sleeved on the guide pin, and one end of the spring is fixedly connected with the yoke.

Further, a positioning flange is provided on a side of the moving carrier disc that is close to the magnetic conductive disc, and the magnetic conductive disc is sleeved on the positioning flange.

Further, the moving carrier disc is provided with magnet grooves, and the magnets are fixed in the magnet grooves.

Further, a position-limiting plate is provided on a side of the yoke that is close to the moving carrier disc, and the position-limiting plate is configured to maintain a preset air gap between the iron cores and the magnets when clutch is engaged.

Further, the electromagnetic coils are connected in any of the following ways: parallel, series, group series, group parallel or hybrid connection.

The advantages and beneficial effects of the present disclosure are as follows.

The bistable electromagnetic clutch of the present disclosure does not need to be powered on or consume any other form of energy both in the disengaged state and in the engaged state, and thus has the advantages of no energy consumption, no heat generation and long service life: it effectively avoids the risk of sudden disconnection of the clutch due to power failure, mechanically fail-safe and thus improves the safety and reliability of the whole system. Moreover, in the bistable electromagnetic clutch, two adjacent electromagnetic coils are set as a group, the two electromagnetic coils in the same group are wound to form a group of windings with identical magnetic polarities, and the corresponding two magnets form a group of magnetomotive forces with identical magnetic polarities, so that the two electromagnetic coils in the same group form a closed magnetic circuit loop, which can effectively avoid the phenomenon of magnetic leakage, improve the utilization rate of magnet and electromagnetic coil, and achieve the lightweight and compact design of electromagnetic clutch.

BRIEF DESCRIPTION OF DRAWINGS

By reading the detailed description of the preferred embodiments below; various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings:

The FIGURE is an exploded structural diagram of a bistable electromagnetic clutch according to a first embodiment of the present disclosure.

In the FIGURE; 1. magnetic yoke; 2. iron core; 3. electromagnetic coil; 4. moving carrier disc; 5. magnetic conductive disc; 6. magnet; 7. guide pin; 8. guide hole; 9. position-limiting flange; 10. induction coil; 11. induction block; 12. magnetic isolation sleeve; 13. positioning flange; 14. magnet groove; 15: spring part; 16: spring; 17: position-limiting plate.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions according to various embodiments of the present disclosure will be described in detail below in conjunction with the accompanying drawings.

First Embodiment

The present embodiment proposes a bistable electromagnetic clutch, which comprises a first part, a second part and a spring part 15. The first part is a fixed part and the second part is a movable part. The fixed part maintains a fixed position in the axial direction of the electromagnetic clutch, and the movable part can move along the axial direction of the electromagnetic clutch, so that the electromagnetic clutch can switch between the engaged position and the disengaged position. Of course, alternatively, the first part may be a movable part, and the second part may be a fixed part.

Specifically, as shown in the FIGURE, the first part comprises a yoke 1, a plurality of iron cores 2 and a plurality of electromagnetic coils 3. A plurality of iron cores 2 are provided on the same side of the yoke 1 along the circumferential direction of the yoke 1. A plurality of electromagnetic coils 3 are respectively sleeved on the plurality of iron cores 2. An electromagnetic force can be generated when the electromagnetic coil 3 is energized.

The second part comprises a moving carrier disc 4 and a magnetic conductive disc 5. The magnetic conductive disc 5 is fixed on a side of the moving carrier disc 4 that is away from the yoke 1. The yoke 1, the moving carrier disc 4 and the magnetic conductive disc 5 form a correspondence relationship along the axial direction of the electromagnetic clutch. The moving carrier disc 4 is provided thereon with a plurality of magnets 6, and the axes of the plurality of magnets 6 are respectively in the same line with the axes of the plurality of iron cores 2, so as to facilitate the accurate engagement between the iron cores 2 and the magnets 6.

In the present embodiment, eight iron cores and eight magnets are provided according to the sizes of the yoke and moving carrier disc to ensure the engagement stability between the yoke and moving carrier disc. In other embodiments, the numbers and positions of the iron cores and the magnets may be adjusted according to different design requirements. In addition, in the present embodiment, the yoke and magnetic conductive disc are designed to have an integral structure, that is, a circular ring structure. Of course, the yoke and/or the magnetic conductive disc may also be designed to have other shapes than circular ring according to the different use environment.

The spring part 15 is configured to adjust the positional relationship between the moving carrier disc 4 and the yoke 1. In the present embodiment, the spring part 15 is disposed between the moving carrier disc 4 and the yoke 1, and the spring part 15 is preloaded in a compressed state, so that the moving carrier disc 4 and the yoke 1 can be maintained in separated positions in a natural state.

In the present embodiment, since the iron core is provided independently, the magnetic induction intensity generated by the electromagnetic coil can be more concentrated and dense relative to the magnet, so as to obtain a higher electric energy conversion rate. At this point, according to the principle that similar poles repel each other while different poles attract each other, much different electromagnetic forces can be generated by controlling the electromagnetic coil to switch between the forward energization and the reverse energization, and then the position relationship between the moving carrier disc and the yoke can be adjusted by cooperating with the spring part.

When the electromagnetic coil is energized in the forward direction, the electromagnetic force generated by the electromagnetic coil increases the binding force between the iron core and the magnet, so as to drive the moving carrier disc to move to a position where it is engaged with the yoke against the preload of the spring part.

When the electromagnetic coil is energized in the reverse direction, the electromagnetic force generated by the electromagnetic coil reduces the binding force between the iron core and the magnet, so that the moving carrier disc moves away from the yoke under the preload of the spring part, so as to push the moving carrier disc to a position where it is separated from the yoke.

Preferably, in the present embodiment, two adjacent electromagnetic coils are set as a group, and the two electromagnetic coils in the same group are wound to form a group of windings with identical magnetic polarities, that is, to form a consequent pole winding, and their corresponding two magnets are set to form a group of magnetomotive forces with identical magnetic polarities. At this point, the two electromagnetic coils in the same group form a U-shaped magnetic circuit with the yoke after being energized, and then form a closed annular magnetic circuit through the corresponding magnets and the magnetic conductive disc, which can effectively avoid the occurrence of magnetic flux leakage, improve the electromagnetic utilization rate, and improve the utilization rate of the magnets and the electromagnetic coils.

The working principle of the bistable electromagnetic clutch in the present embodiment is as follows.

When the electromagnetic coil is in the non-energized state, the electromagnetic coil does not generate an electromagnetic force on the iron core, and the preload of the spring part is greater than the natural binding force between the iron core and the magnet, so that the moving carrier disc and the yoke are in the natural separation positions under the preload of the spring part, that is, a large air gap is maintained between the moving carrier disc and the yoke.

When the electromagnetic coil is energized in the forward direction, the electromagnetic coil generates a forward electromagnetic force on the iron core, so that the binding force between the iron core and the magnet is increased to be greater than the preload of the spring part, so as to move the moving carrier disc to a position where it is engaged with the yoke, that is, a small air gap is formed between the moving carrier disc and the yoke. At this point, if the electromagnetic coil is powered off, and the electromagnetic force generated by the electromagnetic coil is eliminated, the binding force formed between the iron core and the magnet will still remain to be greater than the preload of the spring part, so that the moving carrier disc is kept in the position where it is engaged with the yoke, and the electromagnetic coil is in a state of no power consumption.

When the electromagnetic coil is energized in the reverse direction, the electromagnetic coil generates a reverse electromagnetic force on the iron core, so that the binding force between the iron core and the magnet is reduced to be less than the preload of the spring part, so as to move the moving carrier disc to a position where it is separated from the yoke under the preload of the spring part, that is, a larger air gap is formed between the moving carrier disc and the yoke.

In sum, the bistable electromagnetic clutch of the present embodiment does not need to be powered on or consume any other form of energy both in the disengaged state and in the engaged state, and thus has the advantages of no energy consumption, no heat generation and long service life: it effectively avoids the risk of sudden disconnection of the clutch due to power failure, and thus improves the safety and reliability of the whole system. Moreover, in the bistable electromagnetic clutch of the present embodiment, two adjacent electromagnetic coils are set as a group, the two electromagnetic coils in the same group are wound to form a group of windings with identical magnetic polarities, and the corresponding two magnets form a group of magneto-motive forces with identical magnetic polarities, so that the two electromagnetic coils in the same group form a closed magnetic circuit loop, which can effectively avoid the phenomenon of magnetic leakage, improve the utilization rate of magnet and electromagnetic coil, and achieve the lightweight and compact design of electromagnetic clutch.

In the present embodiment, as shown in the FIGURE, the yoke 1 is further provided thereon with a guide pin 7, and the moving carrier disc 4 is provided thereon with a guide hole 8 corresponding to the guide pin 7 along the axial direction. At this point, when the moving carrier disc 4 and the yoke 1 are disposed correspondingly in the axial direction, the end of the guide pin 7 is just inserted into the guide hole 8, and the guide pin 7 can move axially in the guide hole 8. At this point, through the cooperation between the guide pin 7 and the guide hole 8, the moving carrier disc 4 and the yoke 1 can move axially only and cannot rotate relative to each other, so as to ensure that the positions of the electromagnetic coil 3 and the magnet 6 maintain a one-to-one correspondence relation during the disengagement and engagement of the bistable electromagnetic clutch, and further ensure the accuracy and reliability of the switching between the disengagement and engagement of the bistable electromagnetic clutch.

Further, as shown in the FIGURE, in the present embodiment, a position-limiting flange 9 is further provided on the guide pin 7. The position-limiting flange 9) is disposed on an outer circumference of the guide pin 7, and its outer diameter is larger than the diameter of the guide hole 8. At this point, when the bistable electromagnetic clutch is in the engaged state, the guide pin 7 extends into the guide hole 8, and the position-limiting flange 9 forms direct contact with the moving carrier disc 4, so as to maintain the engaged position between the iron core 2 and the magnet 6. In this way, the gap distance between the positioning iron core 2 and the magnet 6 can be formed by the direct contact between the position-limiting flange 9 and the moving carrier disc 4, and the wear caused by the direct contact between the iron core 2 and the magnet 6 for a long time can be avoided, thereby improving the protection of the iron core 2 and the magnet 6 and prolonging the service life of the bistable electromagnetic clutch.

In the present embodiment, the guide pin 7 is made of a ferromagnetic material, and the guide pin 7 is provided thereon with an induction coil 10: moreover, the two induction coils 10 wound on the two adjacent guide pins 7 are set as a group, and the two induction coils 10 in the same group are wound to form a group of windings with identical magnetic polarities. At this point, the two guide pins 7 in the same group pass through the guide hole 8 and form an axial air gap with the induction block 11 provided on the magnetic conductive disc 5, that is, the two guide pins 7 in the same group correspond to the same induction block 11. When the bistable electromagnetic clutch is in a disengaged position, the air gap between the guide pin 7 and the induction block 11 is large: when the bistable electromagnetic clutch is in an engaged position, the air gap between the guide pin 7 and the induction block 11 is small.

The axial air gap between the guide pin and the induction block affects the induction coefficient of the induction coil, that is, when the size of the axial air gap is different, the current signal output by the corresponding induction coil is different. Therefore, an input current signal is applied to the induction coil, and then the size of the air gap between the guide pin and the induction block is determined according to the current signal output by the induction coil, and then the position of the moving carrier disc relative to the yoke is judged, that is, the state of the bistable electromagnetic clutch is judged.

In the present embodiment, the induction coil and the induction block are designed based on the structure of the bistable electromagnetic clutch, which can realize the monitoring of the state of the electromagnetic clutch without increasing the volume of the electromagnetic clutch and affecting the symmetry of the electromagnetic clutch, and thus has the advantages of high integration degree, simple structure and low manufacturing costs.

In addition, in the present embodiment, since the position-limiting flange is provided on the guide pin, the axial position of the induction coil wound on the guide pin is limited by the position-limiting flange, which can prevent the induction coil from moving axially.

In addition, as shown in the FIGURE, a magnetic isolation sleeve 12 is further provided between the magnetic conductive disc 5 and the induction block 11. The magnetic isolation sleeve 12 plays the role of shielding the magnetic circuit on the magnetic conductive disc 5, so that the inductive magnetic circuit generated by the induction coil 10 and the electromagnetic magnetic circuit generated by the electromagnetic coil 3 are independent of each other and do not interfere with each other. The magnetic isolation sleeve 12 is preferably a magnetic isolation aluminum sleeve.

In the present embodiment, the spring part 15 is a compression spring 16 and is sleeved on the guide pin. Specifically, the spring 16 is sleeved on the outside of the induction coil, and one end of the spring 16 is directly and fixedly connected with the yoke. By selecting the spring as the spring part, the space volume inside the bistable electromagnetic clutch can be fully utilized to make its structure more compact.

In the present embodiment, as shown in the FIGURE, a positioning flange 13 is further provided on the side of the moving carrier disc 4 that is close to the magnetic conductive disc 5, and the magnetic conductive disc 5 is sleeved on the positioning flange 13, so as to realize the positioning connection between the magnetic conductive disc 5 and the moving carrier disc 4, and ensure that the magnetic conductive disc 5 and the moving carrier disc 4 are on the same axial straight line.

As shown in the FIGURE, the moving carrier disc 4 of the present embodiment is provided thereon with magnet grooves 14, and the magnets 6 are fixed in the magnet grooves 14. Specifically, the magnets are fixed in the magnet grooves by glue filling or injection molding, so as to reduce the thickness and size of the moving carrier disc, further reduce the size of the whole clutch and achieve miniaturization design.

In addition, according to different design requirements, the top surfaces of the magnets may have different shapes, such as rectangle, square, triangle or circle.

In addition, in the present embodiment, the electromagnetic coils can be connected in any of the following ways: parallel, series, group series, group parallel or hybrid connection. In other words, the electromagnetic coils may be connected in series or in group series: or the electromagnetic coils may be connected in parallel or in group parallel: or the electromagnetic coils may be connected in hybrid connection such as series parallel connection, for example, multiple electromagnetic coils are selected to be connected in series as a group, and then several groups of electromagnetic coils that have been connected in series are further connected in parallel.

Second Embodiment

In the present embodiment, the first part is a fixed part and the second part is a movable part. It differs from the first embodiment in that the spring part is provided with a tensile preload, and the spring part is disposed between the second part and the external structure. For example, when the bistable electromagnetic clutch is used to cooperate with the gearbox, the gearbox case may be selected as the external structure to arrange the spring part, so as to form a normal pulling force on the second part, and thus the moving carrier disc and the yoke form a normal separation position relationship.

The working principle of the bistable electromagnetic clutch in the present embodiment is as follows.

When the electromagnetic coil is in the non-energized state, the electromagnetic coil does not generate an electromagnetic force on the iron core, and the tensile preload of the spring part is greater than the natural binding force between the iron core and the magnet, so that the moving carrier disc and the yoke are in the natural separation position under the preload of the spring part, that is, a large air gap is maintained between the moving carrier disc and the yoke.

When the electromagnetic coil is energized in the forward direction, the electromagnetic coil generates a forward electromagnetic force on the iron core, the binding force between the iron core and the magnet is increased to be greater than the tensile preload of the spring part, so as to move the moving carrier disc to a position where it is engaged with the yoke, that is, a small air gap is formed between the moving carrier disc and the yoke. At this point, if the electromagnetic coil is powered off, and the electromagnetic force generated by the electromagnetic coil is eliminated, the binding force formed between the iron core and the magnet will still remain to be greater than the tensile preload of the spring part, so that the moving carrier disc is kept in the position where it is engaged with the yoke, and the electromagnetic coil is in a state of no power consumption.

When the electromagnetic coil is energized in the reverse direction, the electromagnetic coil generates a reverse electromagnetic force on the iron core, the binding force between the iron core and the magnet is reduced to be less than the tensile preload of the spring part, so as to move the moving carrier disc to a position where it is separated from the yoke under the preload of the spring part, that is, a larger air gap is formed between the moving carrier disc and the yoke.

Third Embodiment

The present embodiment differs from the first embodiment in that the yoke and magnetic conductive disc are designed to have a split structure, that is, they are respectively composed of multiple parts. In this way, without affecting the setting of iron core and guide pin on the yoke and the magnetic circuit design, the yoke and magnetic conductive disc are designed as a split structure, which can be adjusted according to the actual use environment of the bistable electromagnetic clutch, and is convenient for the electromagnetic clutch to be better arranged in the power transmission structure. Of course, alternatively, only the yoke or only the magnetic conductive disc may be designed as a split structure.

Fourth Embodiment

The present embodiment differs from the first embodiment in that a position-limiting plate 17 is provided on the side of the yoke that is close to the moving carrier disc, and the position-limiting plate 17 is provided along the axial direction to control the air gap size when the iron cores and the magnets are engaged, and ensure a preset air gap when the iron cores and the magnets are engaged, thereby preventing the wear caused by direct contact between the iron cores and the magnets for a long time.

In addition, according to different designs and use environments, for example, according to the use requirements of low-noise environment, a dampening pad may be further provided on the position-limiting plate 17, and the dampening pad is used to achieve the effect of dampening and reducing noise.

Fifth Embodiment

The present embodiment differs from the first embodiment in that the positioning flange on the moving carrier disc is disposed on the outer circumference of the moving carrier disc, and the inner diameter of the positioning flange is consistent with the outer diameter of the magnetic conductive disc, so as to realize the positioning and fixation between the moving carrier disc and the magnetic conductive disc by means of the outer diameter of the magnetic conductive disc.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the purpose of the present disclosure, and the protection scope of the present disclosure should be subject to the protection scope of the claims.

What is claimed is:
1. A bistable electromagnetic clutch, comprising:
   a first part that includes a yoke having a plurality of iron cores disposed thereon, and an electromagnetic coil disposed on each of the iron cores;
   a second part including a moving carrier disc and a magnetic conductive disc fixed on a side of the moving carrier disc that is away from the yoke, a plurality of magnets fixed on the moving carrier disc and disposed in a position corresponding to the plurality of iron cores; and
   a spring part configured to keep the moving carrier disc and the yoke in normally separated positions;
   wherein two adjacent electromagnetic coils form a group, two electromagnetic coils in a same group are wound to form a group of windings with identical magnetic polarities, and corresponding two magnets form a group of magnetomotive forces with identical magnetic polarities, wherein the yoke is provided thereon with a guide pin, the moving carrier disc is provided thereon with a guide hole, and the guide pin is movable axially relative to the guide hole.

2. The bistable electromagnetic clutch according to claim 1, wherein a position-limiting flange is provided on an outer circumference of the guide pin, and the position-limiting flange cooperates with the guide hole to maintain an air gap when the iron core is engaged with the magnet.

3. The bistable electromagnetic clutch according to claim 2, wherein the electromagnetic coils are connected by at least one of a parallel connection, a series connection, a group series connection, a group parallel connection or a hybrid connection.

4. The bistable electromagnetic clutch according to claim 1, wherein the guide pin is made of a ferromagnetic material;
two adjacent guide pins and two induction coils that are wound respectively on the two adjacent guide pins form a group, the two induction coils in a same group are wound to form a group of windings with identical magnetic polarities, and the two guide pins in a same group pass through the guide holes and form an axial air gap with an induction block on the magnetic conductive disc;
the axial position of the moving carrier disc relative to the yoke is judged according to a current signal output by the induction coil.

5. The bistable electromagnetic clutch according to claim 4, wherein a magnetic isolation sleeve is provided between the magnetic conductive disc and the induction block.

6. The bistable electromagnetic clutch according to claim 5, wherein the electromagnetic coils are connected by at least one of a parallel connection, a series connection, a group series connection, a group parallel connection or a hybrid connection.

7. The bistable electromagnetic clutch according to claim 4, wherein the electromagnetic coils are connected by at least one of a parallel connection, a series connection, a group series connection, a group parallel connection or a hybrid connection.

8. The bistable electromagnetic clutch according to claim 1, wherein the spring part includes springs sleeved on the guide pin, and one end of at least one of the springs is fixedly connected with the yoke.

9. The bistable electromagnetic clutch according to claim 8, wherein the electromagnetic coils are connected by at least one of a parallel connection, a series connection, a group series connection, a group parallel connection or a hybrid connection.

10. The bistable electromagnetic clutch according to claim 1, wherein a positioning flange is provided on a side of the moving carrier disc that is close to the magnetic conductive disc, and the magnetic conductive disc is sleeved on the positioning flange.

11. The bistable electromagnetic clutch according to claim 10, wherein the electromagnetic coils are connected by at least one of a parallel connection, a series connection, a group series connection, a group parallel connection or a hybrid connection.

12. The bistable electromagnetic clutch according to claim 1, wherein the moving carrier disc is provided thereon with magnet grooves, and the magnets are fixed in the magnet grooves.

13. The bistable electromagnetic clutch according to claim 12, wherein the electromagnetic coils are connected by at least one of a parallel connection, a series connection, a group series connection, a group parallel connection or a hybrid connection.

14. The bistable electromagnetic clutch according to claim 1, wherein a position-limiting plate is provided on a side of the yoke that is close to the moving carrier disc, and the position-limiting plate is configured to maintain a preset air gap between the iron core and magnet when the clutch is engaged.

15. The bistable electromagnetic clutch according to claim 14, wherein the electromagnetic coils are connected by at least one of a parallel connection, a series connection, a group series connection, a group parallel connection or a hybrid connection.

16. The bistable electromagnetic clutch according to claim 1, wherein the electromagnetic coils are connected by at least one of a parallel connection, a series connection, a group series connection, a group parallel connection or a hybrid connection.

* * * * *